US011056849B2

(12) United States Patent
Sixt et al.

(10) Patent No.: US 11,056,849 B2
(45) Date of Patent: Jul. 6, 2021

(54) SLIP RING TRANSMITTER FOR ROTARY-TABLE MACHINES

(71) Applicant: KRONES AG, Neutraubling (DE)

(72) Inventors: Robert Sixt, Kelheim (DE); Rohit Kumar, Regensburg (DE)

(73) Assignee: KRONES AG, Neutraubling (DE)

( * ) Notice: Subject to any disclaimer, the term of this patent is extended or adjusted under 35 U.S.C. 154(b) by 403 days.

(21) Appl. No.: 16/063,817

(22) PCT Filed: Dec. 15, 2016

(86) PCT No.: PCT/EP2016/081261
§ 371 (c)(1),
(2) Date: Jun. 19, 2018

(87) PCT Pub. No.: WO2017/153015
PCT Pub. Date: Sep. 14, 2017

(65) Prior Publication Data
US 2020/0280155 A1     Sep. 3, 2020

(30) Foreign Application Priority Data

Mar. 8, 2016   (DE) .................. 10 2016 203 762.5

(51) Int. Cl.
*H01R 39/14* (2006.01)
*H01R 39/08* (2006.01)
(Continued)

(52) U.S. Cl.
CPC ............. *H01R 39/08* (2013.01); *H01R 39/58* (2013.01); *H01R 43/14* (2013.01); *H02K 11/33* (2016.01); *H02K 11/35* (2016.01); *H02K 13/003* (2013.01)

(58) Field of Classification Search
CPC .... H02K 13/003; H01R 39/085; H01R 39/08; H01R 39/14; H01R 39/56; H01R 39/64
See application file for complete search history.

(56) References Cited

U.S. PATENT DOCUMENTS 2,623,188 A      12/1952  Le Tourneau et al.
4,189,702 A  *   2/1980   Maloy ................. G01S 7/521
                                                    310/232
(Continued)

FOREIGN PATENT DOCUMENTS

CN         2632319 Y       8/2004
CN       101882740 A      11/2010
(Continued)

OTHER PUBLICATIONS

ISA European Patent Office, International Search Report Issued in Application No. PCT/EP2016/081261, dated Mar. 29, 2017, WIPO, 4 pages.
(Continued)

*Primary Examiner* — Dang D Le
(74) *Attorney, Agent, or Firm* — McCoy Russell LLP

(57) ABSTRACT

A slip ring transmitter for electrically connecting assemblies of rotary-table machines is described and comprises a slip ring with a signal unit for transmitting signals and/or data and with a power unit for transmitting electrical power. As the signal unit is formed such that it is modularly detachable can in particular be axially drawn off from the power unit, the signal unit can be inspected and/or replaced separately from the power unit. This improves the reliability of the transmission of signals and/or data and enables individual optimization of the power unit.

17 Claims, 3 Drawing Sheets

(51) Int. Cl.
*H02K 11/33* (2016.01)
*H02K 11/35* (2016.01)
*H01R 39/58* (2006.01)
*H01R 43/14* (2006.01)
*H02K 13/00* (2006.01)

(56) References Cited

U.S. PATENT DOCUMENTS

| | | | |
|---|---|---|---|
| 4,333,095 A | 6/1982 | Silva | |
| 5,870,026 A | 2/1999 | Challenger | |
| 6,089,875 A * | 7/2000 | Iwata | H01R 39/14 439/23 |
| 9,039,423 B2 * | 5/2015 | Shinder-Lerner | H01R 39/18 439/13 |
| 2001/0033117 A1 | 10/2001 | Vesper et al. | |
| 2004/0130230 A1 | 7/2004 | Zilch | |

FOREIGN PATENT DOCUMENTS

| | | |
|---|---|---|
| CN | 202031788 U | 11/2011 |
| CN | 202183548 U | 4/2012 |
| CN | 102496824 A | 6/2012 |
| CN | 102723649 A | 10/2012 |
| CN | 205004597 U | 1/2016 |
| DE | 3509299 A1 | 9/1986 |
| DE | 10257623 A1 | 7/2004 |
| DE | 102007054675 A1 | 5/2008 |
| DE | 102012203098 A1 | 4/2013 |
| DE | 102012220293 A1 | 5/2014 |
| EP | 0512234 A2 | 11/1992 |
| EP | 1566258 A2 | 8/2005 |
| EP | 1768235 A1 | 3/2007 |
| EP | 2146402 A1 | 1/2010 |
| WO | 2010043290 A1 | 4/2010 |
| WO | 2012123402 A1 | 9/2012 |

OTHER PUBLICATIONS

"Schleifring and Apparatebau GmbH," Schleifring Website, Available Online at https://www.schleifring.de/wp-content/uploads/2019/09/SCHLEIFRING_Technology.pdf, Available as Early as Jul. 2003, 2 pages.

Moog Components Group, "Motion Technology Catalog: Slip Rings-Fiber Optic Rotary Joints," Hidrapa Website, Available Online at http://www.hidrapa.com.br/Documentos/Moog/Slip%20Rings.pdf, Available as Early as Jan. 2004, 88 pages.

"Schleifring Datenblatt-Serie G200, G300, G400," Schleifring Website, Available Online at http://www.slipring-systems.com/de_pdf/news/News._Archiv/G_dt.pdf, Available as Early as Mar. 2004, 12 pages. (Submitted with Partial Machine Translation).

"Schleifring-Slip Ring Solutions Industrial Applications," Schleifring Website, Available Online at https://www.schleifring.de/wp-content/uploads/2019/09/SCHLEIFRING_Surveillance.pdf,Available as Early as Mar. 2012, 16 pages.

Schilling, H., "Data Transmission Concepts for a Breast CT," Dissertation of Medical Physics, Friedrich-Alexander-Universität Erlangen-Nürnberg (FAU), Nov. 19, 2014, 145 pages. (Submitted with Machine Translation of Abstract).

"Schleifringkörper-Conductix Wampfler Brochure," Conductix Wampfler Website, Available Online at https://pdf.directindustry.com/pdf/conductix-wampfler/slip-ring-assemblies-energy-data-transmission/9326-747677.html, Available as Eartly as Jan. 2015, 76 pages. (Submitted with Partial Translation).

"Schleifring-Slip ring," Wayback Machine Website, Available Online at https://web.archive.org/web/20151125095834/https://de.wikipedia.org/wiki/Schleifring, Nov. 25, 2015, 4 pages. (Submitted with Machine Translation).

European Patent Office, Objection to EP3427352 "Slip Ring Transmisster for Rotary-Table Machines," Issued in Application No. 16819857.0, Apr. 20, 2021, Deutschland, 63 pages. (Submitted with Machine Translation).

* cited by examiner

SLIP RING TRANSMITTER FOR ROTARY-TABLE MACHINES

CROSS-REFERENCE TO RELATED APPLICATIONS

The present application is a U.S. National Phase of International Patent Application Serial No. PCT/EP2016/081261 entitled "SLIP-RING TRANSMITTER FOR ROTARY-TABLE MACHINES," filed on Dec. 15, 2016. International Patent Application Serial No. PCT/EP2016/081261 claims priority to German Patent Application No. 10 2016 203 762.5, filed on Mar. 8, 2016. The entire contents of each of the abovementioned applications are hereby incorporated by reference in their entirety for all purposes.

TECHNICAL FIELD

Rotary-table machines with at least one stationary assembly and at least one rotating assembly are known to be used for the production of plastic bottles and for processing plastic bottles and glass bottles, for example, by inspection, labeling and/or filling, in bottling systems. Slip ring transmitters are used for transmitting electrical signals, such as control signals and data, and for transmitting electrical power to supply consumers in the rotating assemblies. The slip ring transmitter then comprises a central slip ring with a signal unit, in which slip tracks are formed for transmitting electrical signals and/or data, and with a power unit, in which slip tracks for transmitting electrical power are formed. Furthermore, the slip ring transmitter comprises associated brushes for contacting the individual slip tracks.

BACKGROUND AND SUMMARY

Contact materials, mostly gold or silver alloys on the brush side, are typically used for the transmission of electrical signals and data. A galvanic connection to the slip ring results in a high electrical conductivity, low abrasion and high oxidation resistance. However, due to the brittleness of the material and the friction caused at the contact surfaces, contact pairs made of gold or silver alloys usually need to be lubricated with a thin film of oil. The quantity and the type of oil are to be specifically adapted to the contact materials.

Brushes made of sintered graphite and slip tracks made of brass or copper as well as gold-plated or silver-plated brass are primarily suitable for the transmission of electrical power. Brushes made of graphite are cheaper to purchase than brushes made of gold or silver alloys and are particularly suitable for the transmission of greater electrical power. However, problems arise with graphite brushes due to the influence of temperature and humidity, due to dust, wear debris or burn-off, and due to a relatively high wear and thus correspondingly high maintenance.

Since comparatively low electrical power is typically to be transmitted to rotary assemblies in rotary-table machines of beverage filling systems, slip ring transmitters with slip tracks and brushes made of gold or silver alloys are usually preferred there. For a higher power demand, individual slip tracks can be scaled by widening.

Significantly more problematic, however, is the signal unit, since electrical signals and data must be reliably transmitted at a comparatively high speed. Due to the comparatively low error tolerance of conventional digital transmission protocols, even slight vibrations in the rotary-table machines can cause a brief interruption of the galvanic connection between the brush and the slip track. In addition, the contacting quality of individual signal tracks can be impaired by insufficient lubrication, contamination and/or oxidation of the pairs of contacts such that the signal transmission is interrupted. In addition, the demands regarding the mechanical stability of housings and bearings as well as, in particular, torsion-free mounting of the pairs of contacts are comparatively high.

Since identical contact materials have hitherto been used in the signal unit and in the power unit for reasons of manufacturing technology, the service life of such slip ring transmitters is limited to approximately 40 million revolutions due to the preferred material combination of gold/gold or silver/silver. Thereafter, repair is usually uneconomical and replacement of the stator and the rotor is necessary.

Therefore, a demand exists for a slip ring transmitter which can be employed in a more reliable manner for signal transmission and which is also more economical in long-term operation.

This object posed is satisfied by a slip ring transmitter according to the disclosed embodiments. The slip ring transmitter is suitable for the electrical connection of assemblies of rotary-table machines. Such assemblies comprise, for example, electrically powered and/or controlled motors, sensors, control units, power supplies, or the like. The slip ring transmitter comprises a slip ring with a signal unit for transmitting signals and/or data and a power unit for transmitting electrical power. According to the invention, the signal unit is formed to be detachable from the power unit in a modular manner, in particular, can be axially drawn off. In particular, the signal unit can be detached while the power unit is installed. The signal unit can therefore be inspected or replaced separately from the power unit.

By definition, the slip ring transmitter comprises a central slip ring and corresponding brushes and/or non-contact transmission elements. The slip ring comprises several slip tracks or similar ring tracks and electrical terminals for connecting the slip tracks/ring tracks with connecting cables. For example, the brushes are grouped on at least one brush block. The brushes are also surrounded by a housing in which the slip ring is rotatably mounted.

The slip ring transmitter is preferably used to connect stationary assemblies with assemblies rotating on a carousel.

The signal unit and the power unit can be configured to be locked to each other in the axial direction, for example by a releasable force-fit and/or positive-fit connection. The signal unit and the power unit are preferably coupled to each other in the operating mode in a rotationally-fixed manner by a positive-fit connection.

The signal unit and the power unit can sit on a common shaft or similar support members. A central channel, for example, for media supply can run through the signal unit and the power unit.

The power unit is preferably configured for contact transmission and the signal unit for non-contact transmission. Non-contact transmission in the signal unit is relatively resistant to interference and substantially free of wear. Furthermore, slip tracks and brushes of the power unit can then be optimized largely independent of the signal unit.

The signal unit is preferably designed for optical, capacitive and/or inductive signal transmission. Optical signal transmission is particularly suitable for high data rates up to 8 Gbit/s and is insensitive to electromagnetic interference. Optical signal transmission is particularly suitable for connecting to optical fibers.

Capacitive signal transmission allows for high data rates of up to 8 Gbit/s with high reliability and a low bit error rate.

Capacitive signal transmission is also immune to interference from electromagnetic interference.

Inductive transmission is particularly suitable for signal transmission and the transmission of electrical power. Inductive signal transmission therefore offers additional flexibility in terms of occupancy of individual non-contact transmission tracks.

The slip ring preferably comprises plug terminals for electrically connecting the signal unit by way of the power unit. The electrical connection to the slip ring can be released by drawing the signal unit off from the power unit and be restored by simply pushing it back on.

For optical signal transmission, at least one optical plug terminal for connecting the signal unit can also be formed on the slip ring. This facilitates maintenance and/or replacement of the signal unit.

The slip ring transmitter preferably further comprises a housing with an inspection opening through which the signal unit is passed. This additionally facilitates maintenance.

The slip ring transmitter preferably further comprises a brush block with brushes for contacting the power unit. In particular brushes with a predominant proportion of graphite are self-lubricating, durable and particularly suitable for the transmission of electrical power.

The slip ring transmitter preferably further comprises a housing with inspection openings for replacement of the brushes. This simplifies maintenance of the slip ring transmitter while it is installed. Inspection openings oppositely arranged on the housing are formed for associated brush blocks.

Electrically and/or optically detectable wear indicators are preferably formed on the brushes. The wear indicators can be formed, for example, as electrical contacts, as optical reflection strips or the like. This allows maintenance intervals to be extended, premature wear of the slip tracks to be prevented and monitoring to be carried out remotely.

The power unit preferably comprises slip tracks made of brass. Brass is comparatively low in wear and is particularly suitable for being combined with graphite brushes. The contact surface of the slip tracks is there preferably made of brass. It would also be conceivable, however, to coat such slip tracks made of brass with a gold alloy or a silver alloy.

The slip ring transmitter further preferably comprises a housing with a partition wall for shielding the signal unit from the power unit in a manner retaining graphite dust, in particular in a hermetically sealed manner. As a result, fouling and maintenance of the signal unit caused thereby can be avoided. Accordingly, graphite wear debris can be limited to a housing unit surrounding the power unit.

The partition wall or outer housing can comprise, for example, a filter permeable to air which is impermeable to graphite dust. As a result, pressure exchange and/or gas exchange is made possible to counteract condensation forming inside the housing. By hermetically sealing the power unit against the signal unit, it is excluded that the signal unit is fouled by graphite wear debris or the like. The slip ring transmitter preferably further comprises a housing and an extractor for removing dust by suction, in particular graphite dust, from a housing section surrounding the power unit. This allows the power unit or the associated housing section with the slip ring transmitter installed to be kept clean in a simple manner.

Preferably, the slip ring transmitter further comprises a housing with modular, in particular, modular stackable housing sections for the signal unit and the power unit. This enables an economic adaptation of the slip ring transmitter to the signals and/or data as well as the electrical power to be transmitted in the respective rotary-table machine.

The power unit preferably comprises modularly stackable insulator segments and slip ring segments with slip tracks. The power unit can then be flexibly adapted in terms of the number and size of its slip tracks to the power to be transmitted for individual consumers of the rotary-table machine.

The slip ring segments can preferably be stacked with slip tracks that contact each other in the axial direction. Several slip tracks can then be combined for power scaling to form a wider slip track. As a result, the width of the slip tracks can be flexibly adapted to the power to be transmitted.

The object posed is also satisfied by a rotary-table machine for producing, filling, sealing, labeling, printing, cleaning and/or inspecting containers, in particular bottles, where the rotary-table machine comprises a slip ring transmitter according to at least one of the embodiments described above. As a result, stationary assemblies of the rotary-table machine and rotating assemblies of the rotary-table machine can be connected for reliable transmission of signals and for the transmission of data at a high data rate, and for providing electrical power for electrical consumers present in rotating assemblies.

The signal unit can then preferably be exchanged while a power unit is installed in the rotary-table machine. This facilitates maintenance of the rotary-table machine.

BRIEF DESCRIPTION OF FIGURES

A preferred embodiment of the invention is illustrated in the drawings, where.

DETAILED DESCRIPTION

Figure 1:
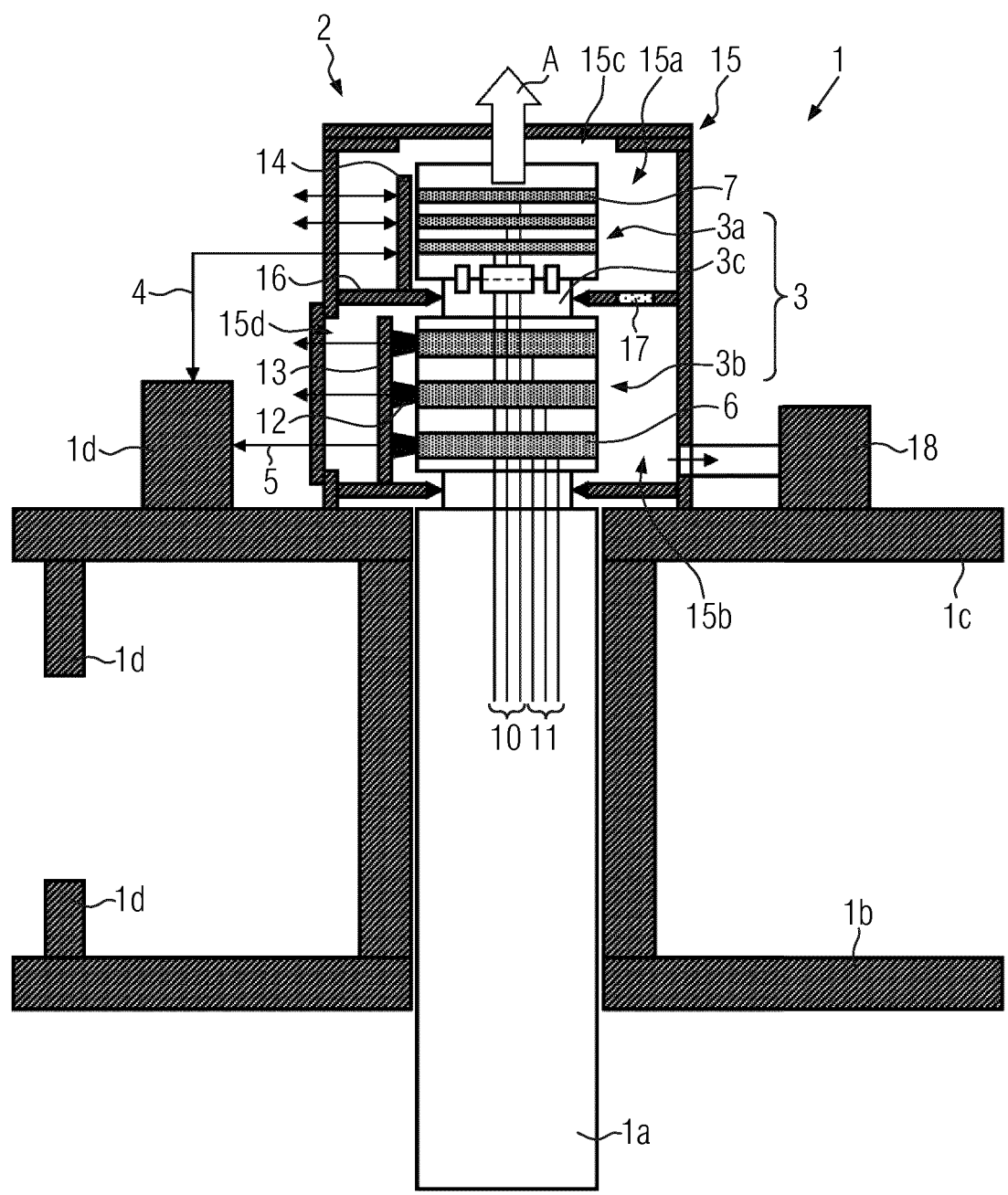
FIG. 1 shows a schematic partial view of a rotary-table machine with a slip ring transmitter.

As is evident from FIG. 1 in a schematic partial view of a rotary-table machine 1, slip ring transmitter 2 according to the invention comprises a slip ring 3 with a signal unit 3a for transmitting signals and/or data 4 and with a power unit 3b for transmitting electrical power 5.

Signal unit 3a and power unit 3b are formed as modules that are detachable from each other. In particular, signal unit 3a can be detached from power unit 3b installed in slip ring transmitter 2, for example, for maintenance measures. For this purpose, signal unit 3a can preferably be drawn off in the axial direction A from power unit 3b.

Power unit 3b comprises slip tracks 6 which have, for example, contact surfaces made of brass, gold alloy or silver alloy. Signal unit 3a comprises ring tracks 7 which are preferably designed for non-contact transmission of signals and/or data 4 by way of a capacitive, optical or inductive coupling. For the sake of simplicity, three slip tracks 6 and three ring tracks 7 are shown schematically in FIG. 1.

Figure 2:
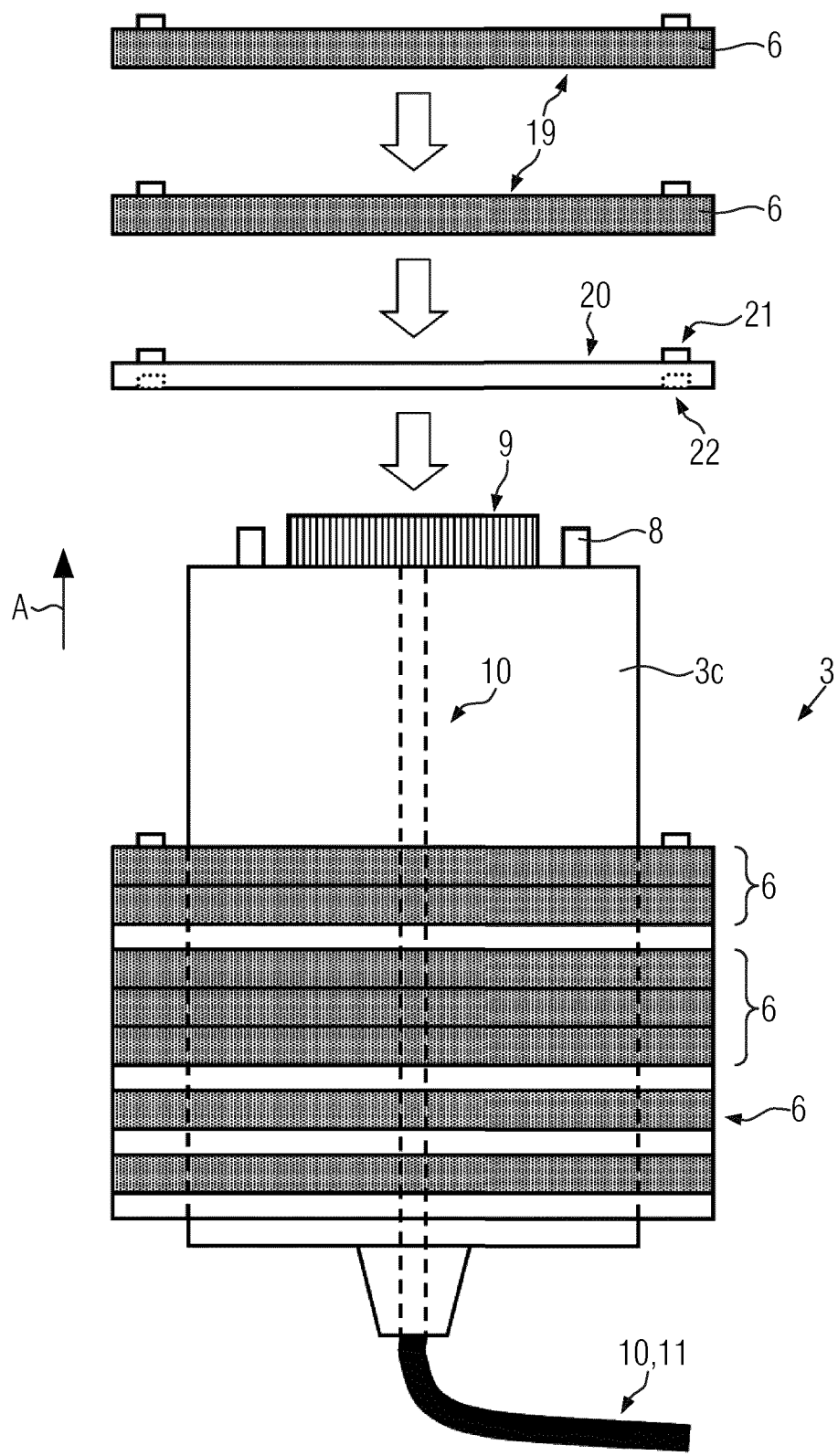
FIG. 2 shows a schematic partial view of slip ring transmitter with a modular design of the power unit.

As can be seen in particular in FIG. 2 in enlarged scale, slip ring 3 preferably comprises mechanical coupling elements 8 for connecting signal unit 3a to power unit 3b in a rotationally fixed manner.

Furthermore, slip ring 3 preferably comprises electrical plug terminals 9 for electrically connecting ring tracks 7 of signal unit 3a to signal and/or data lines 10, which run, for example, in power unit 3b. Furthermore, electrical power lines 11 extend in power unit 3b up to slip tracks 6, see FIG. 1.

Also electrical power 5 for signal unit 3a is transmitted through power unit 3b. For this purpose, at least one associated slip track 6 is tapped in power unit 3b.

Electrical plug terminals 9 are configured such that the electrical connection between ring tracks 7 and signal and/or data lines 10 is interrupted when signal unit 3a is drawn off from power unit 3b and is established when signal unit 3a is pushed onto power unit 3b.

In the rotary-table machine 1 shown by way of example, slip ring 3 is formed as a static component of slip ring transmitter 2 and for this purpose is attached to a stationary main column 1a of rotary-table machine 1. For reasons of clarity, the following machine components of rotary-table machine 1 rotating about main column 1a are shown with diagonal hatching in FIG. 1: a rotating container table 1b, an upper machine part 1c formed integrally therewith, as well as electrically active machine components 1d rotating thereon.

Slip contacts or brushes 12, respectively, are formed on rotating upper machine part 1c rotating with the latter and establish a transmission of electrical power 5 in contact with the associated slip tracks 6. Brushes 12 are preferably made of graphite, a graphite-metal mixture, a graphite sintered material, or the like. However, brushes 12 with contact surfaces made of a gold alloy or a silver alloy are also conceivable.

Brushes 12 or similar slip contacts are preferably attached to at least one brush block 13. Brushes 12 can preferably be exchanged by disassembling associated brush block 13.

The transmission of signals and/or data 4 in signal unit 3a preferably takes place without contact between ring tracks 7 and transmission device 14, for example, operating in a capacitive or optical manner. The latter is connected to upper machine part 1c in a rotationally fixed manner. Transmission device 14 allows for preferably bidirectional exchange of signals and/or data 4.

Slip ring transmitter 2 further comprises a housing 15 which is preferably divided into an upper housing section 15a for receiving signal unit 3a and a lower housing section 15b for receiving power unit 3b. For this purpose, a partition wall 16 is preferably formed between upper housing section 15a and lower housing section 15b. Housing 15 could also be assembled in a modular manner from upper housing section 15a and lower housing section 15b.

Housing 15 preferably comprises an inspection opening 15c which can be closed with a cover and which enables access to signal unit 3a for maintenance measures. Signal unit 3a can be detached and removed, in particular, through inspection opening 15c, from power unit 3b in the axial direction A.

Housing 15 preferably comprises an inspection opening 15d which can be closed with a cover and which enables access to brushes 12 for maintenance measures.

Partition wall 16 can be formed, for example, to be hermetically sealing in order to prevent gas exchange between upper housing section 15a and lower housing section 15b. Alternatively, a dust filter 17 can be formed in partition wall 16 and allow a gas exchange between upper housing section 15a and lower housing section 15b, but is impermeable to dust, especially to graphite dust. In both cases, fouling of signal unit 3a due to graphite wear debris in power unit 3b is prevented. This makes it possible to prevent, in particular, ring tracks 7 and/or transmission device 14 from being fouled with graphite dust. The transmission of signals and/or data 4 is then particularly reliable.

In the alternative or in addition to the sealing partition wall 16, an extraction 18 by suction can be provided for lower housing section 15b. Such extraction 18 by suction can be operated both continuously as well as intermittently to extract any graphite dust or the like by suction that is caused by wear debris of brushes 12 and keep it away from signal unit 3a.

Sealing the components of slip ring transmitter 2, co-rotating with upper machine part 1c, against slip ring 3 can be effected in a conventional manner with sealing lips or the like against a central support member 3c of slip ring 3, as is indicated schematically in FIG. 1. Possibly existing bearings between slip ring 3 and housing 15 are not shown for reasons of clarity.

Brushes 12 are connected by way of connection lines (symbolized by arrows) and/or wirelessly to active machine components 1d which co-rotate on container table 1b or upper machine part 1c. Active machine components 1d are electrically supplied and controlled and are, for example, rotary plates, lifting drives for centering bells, control units or the like.

Ring tracks 7 are connected to machine components 1d by way of transmission device 14 and connection lines (symbolized by arrows) and/or wirelessly for exchanging signals and/or data 4.

The number of slip tracks 6 and ring tracks 7 and associated connection lines 10, 11 is shown only by way of example and depends on the number of rotating active components 1d and the number of respectively required connections for electrical power 5 and for the exchange of signals and/or data 4.

The number of brushes 12 and their distribution possibly to several brush blocks 13 is also shown only by way of example. For example, two brushes 12 running in pairs each on a slip track 6 can be present in order to improve the transmission of electrical power. Brush blocks 13 and associated inspection openings 15d are also preferably formed on mutually opposite sides of housing 15. If necessary, more slip tracks 6 can then be arranged on slip ring 3.

As evidenced by FIG. 2 in this regard, slip ring 3 can have a modular design. For example, in particular ring-shaped slip track segments 19 with slip tracks 6 and, in particular, ring-shaped insulator segments 20 are present which can preferably be stacked on each other in any order, in particular around central support member 3c.

Slip track segments 19 and insulator segments 20 can then be alternately stacked on each other to form slip tracks 6 insulated from one another. Similarly, slip track segments 19 can be stacked directly on each other to perform slip tracks 6 of different widths for power scaling of slip tracks 6.

For stacking slip track segments 19 and insulator segments 20 in a rotationally fixed manner, they and/or central support member 3c can have elevations 21 and recesses 22 or the like formed thereon corresponding to each other in a positive-fit manner.

If a defect in signal unit 3a is detected and/or a prescribed maintenance interval is to be complied with, then signal unit 3a can be accessed by the operating personnel through inspection opening 15c in a simple manner. Signal unit 3a can be drawn off upwardly from power unit 3b in the axial direction A by releasing a conventional, for example, positive-fit and/or force-fit lock (not shown). Signal unit 3a can then be easily inspected and/or if necessary replaced by an operational signal unit 3a. In particular signal units 3a operating in a non-contact manner can be drawn off power unit 3b without any additional separation of brushes or the like that are attached to housing 15.

However, it would also be conceivable to configure signal unit 3a in analogy to power unit 3b. In this case, material pairs of gold alloys or silver alloys in signal unit 3a are advantageous. For example, ring tracks 7 can have a contact surface made of a gold alloy and the slip contacts can be formed as gold spring wires or gold rivets. Alternatively, ring tracks 7 can have a contact surface made of a silver alloy and the slip contacts can be formed as silver strip brushes.

In any case, the modular design of signal unit 3a enables individual detachment from power unit 3b and thus facilitates maintenance of slip ring transmitter 2.

The selection of the material for brushes 12 depends on the conditions of use, such as the specific temperature range, the specific humidity, required stability, allowed wear or the like. This applies at least to power unit 3b and possibly also to a signal unit 3a in contacting operation.

Figure 3:
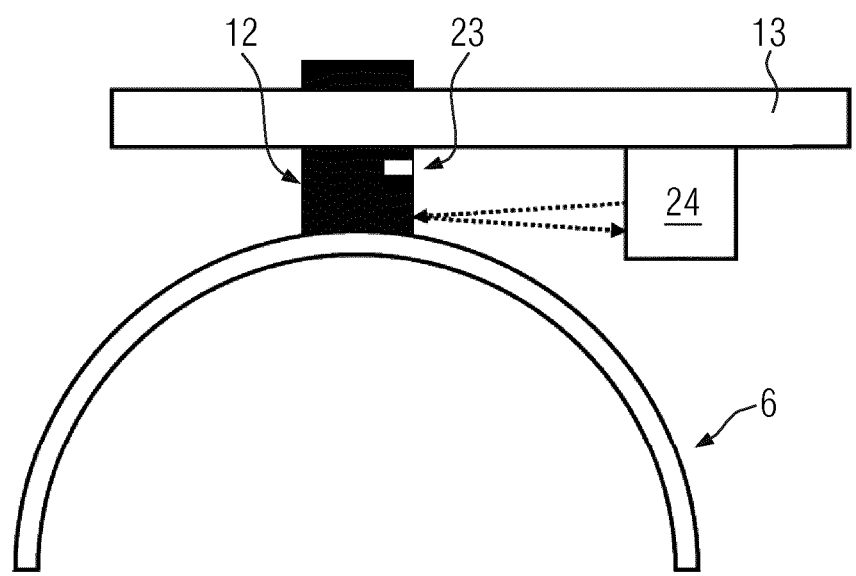
FIG. 3 shows a schematic view of a brush block with a wear sensor.

In addition, an electrically and/or optically detectable wear indicator 23 can be formed on brushes 12. This is shown by way of example and schematically in FIG. 3 as an optically detectable reflective strip. A corresponding sensor 24 then exists in the region of brushes 12, in the example of FIG. 3 in the form of a reflection light barrier. This makes it possible to monitor the degree of wear of brushes 12. As a result, premature wear of slip tracks 6 can be prevented and/or a maintenance interval for replacement of brushes 12 can be maximized by remote diagnosis as needed.

In the embodiment shown, slip ring transmitter 2 is shown with a static slip ring 3 and a housing 15 with brushes 12 and a transmission device 14 rotating relative thereto about slip ring 3. However, slip ring transmitter 2 could also be used with rotating slip ring 3 and brushes 12 that are stationary relative thereto and transmission device 14 that is stationary relative thereto. Slip ring 3 and brushes 12 or transmission device 14, respectively, could also be offset relative to each other in any rotational motion relative to each other.

The invention claimed is:

1. A slip ring transmitter for electrically connecting assemblies of rotary-table machines, comprising:
    a slip ring with a signal unit for transmitting signals and/or data and with a power unit for transmitting electrical power,
    wherein said signal unit is a first module comprising ring tracks and said power unit is a second module comprising slip tracks, and wherein said first module can be detached from said second module while said second module is installed in the slip ring transmitter.

2. The slip ring transmitter according to claim 1, where said power unit is configured for contact transmission and said signal unit for non-contact transmission.

3. The slip ring transmitter according to claim 2, where said signal unit is configured for optical, inductive and/or capacitive signal transmission.

4. The slip ring transmitter according to claim 1, where said slip ring comprises plug terminals for electrically connecting said signal unit by way of said power unit.

5. The slip ring transmitter according to claim 1, further comprising a housing with at least one inspection opening for passing said power unit through.

6. The slip ring transmitter according to claim 1, further comprising a brush block with brushes for contacting said power unit.

7. The slip ring transmitter according to claim 1, further comprising at least one inspection opening in the housing for exchanging said brushes.

8. The slip ring transmitter according to claim 1, where electrically and/or optically detectable wear indicators are formed on said brushes.

9. The slip ring transmitter according to claim 1, where said power unit comprises slip tracks made of brass.

10. The slip ring transmitter according to claim 1, further comprising a partition wall in a housing for shielding said signal unit from said power unit and retaining graphite dust.

11. The slip ring transmitter of claim 10, wherein the partition wall retains graphite dust via hermetic sealing.

12. The slip ring transmitter according to claim 1, where said power unit comprises modularly stackable insulator segments and slip ring segments with slip tracks.

13. The slip ring transmitter according to claim 1, where said slip ring segments can be stacked with the slip tracks axially contacting each other.

14. The slip ring transmitter of claim 1, wherein the signal unit is modularly detachable from said power unit by being axially drawn off.

15. A slip ring transmitter for electrically connecting assemblies of rotary-table machines, comprising:
    a slip ring with a signal unit for transmitting signals and/or data;
    a power unit for transmitting electrical power, wherein said signal unit is modularly detachable from said power unit; and
    a housing and an extractor for removing dust by suction from a housing section surrounding said power unit.

16. A rotary-table machine for producing, filling, sealing, labeling, printing, cleaning and/or inspecting containers with a slip ring transmitter, the slip ring transmitter comprising:
    a slip ring with a signal unit transmitting signals or data;
    a power unit transmitting electrical power, wherein said signal unit and the power unit are separate modules mounted on a support, and the signal unit is modularly detachable from said support and power unit.

17. The rotary-table machine according to claim 16, where said signal unit can be exchanged while said power unit is installed in said rotary-table machine.

* * * * *